United States Patent [19]

Block

[11] 4,409,637

[45] Oct. 11, 1983

[54] CONNECTOR FOR ELECTROMAGNETIC IMPULSE SUPPRESSION

[76] Inventor: Roger R. Block, 4712 S. Wind Blvd., Kissimmee, Fla. 32741

[21] Appl. No.: 441,765

[22] Filed: Nov. 15, 1982

Related U.S. Application Data

[63] Continuation-in-part of Ser. No. 138,354, Apr. 8, 1980, Pat. No. 4,359,764.

[51] Int. Cl.$^3$ .......... H02H 3/22

[52] U.S. Cl. .......... 361/119; 333/23; 361/120

[58] Field of Search .......... 333/12, 23, 167, 185; 361/119, 120

[56] References Cited

U.S. PATENT DOCUMENTS

| | | | |
|---|---|---|---|
| 2,030,179 | 2/1936 | Potter | 333/23 |
| 2,777,998 | 1/1957 | Shepherd | 333/167 |
| 2,886,744 | 5/1959 | McNatt . | |
| 2,922,913 | 1/1960 | Cushman . | |
| 3,274,447 | 9/1966 | Nelson . | |
| 3,777,219 | 12/1973 | Winters . | |
| 3,863,111 | 1/1975 | Martzloff . | |
| 3,968,411 | 7/1976 | Mueller | 361/119 |
| 4,050,092 | 9/1977 | Simokat . | |
| 4,142,220 | 2/1979 | Lundsgaard . | |
| 4,158,869 | 6/1979 | Gilberts . | |

OTHER PUBLICATIONS

CQ Magazine, 7/1980, p. 23.

"Lightning Elimination Associates, Inc., Transient Eliminators".

"Aircraft Protection from Thunderstorm Discharges to Antennas", Electrical Eng. Mag., 10/53.

"Field Experience With Gas-Filled Protectors on Communication Lines", Lemieux, 7/63.

"TII Condensed Catalog and Price List, 11/1/78".

"RMS CATV. Division-Superfit Series-Special Application Connectors".

Huber-Suhner Components Catalog, pp. 44-46.

"Cerberus Surge Protectors-Surge Voltages Rendered Harmless".

*Primary Examiner*—Harry E. Moose, Jr.

[57] ABSTRACT

A connector is provided for the suppression of electromagnetic impulses traveling along a radio frequency transmission line. Paired first and second electrical connectors are provided for being operatively interposed along the transmission line. First and second conductors are provided for electrically coupling the primary conductors and secondary conductors of one connector to their counterparts in the other paired connector. A discharge device or tube having a known breakdown voltage and a known capacitance is coupled between the first and second conductors. A capacitor is coupled in series with the first conductor for blocking the flow of dc energy therethrough. The inductance of the first and second conductors are determined such that this inductance interacts with the capacitance of the discharge device, and the capacitor and other stray capacitance of the combination thereof in order to produce a desired characteristic impedance, which is generally preferred to be equal to the characteristic impedance of the radio frequency transmission line, whereby the suppressor will dissipate electrical surges while representing a low standing wave ratio to radio frequency energy being transmitted along the line. In an alternate embodiment, a groundplane is provided for reducing the effective size of a balanced line embodiment thereof.

14 Claims, 17 Drawing Figures

CONNECTOR FOR ELECTROMAGNETIC IMPULSE SUPPRESSION

This is a continuation in part application of Ser. No. 138,354 filed Apr. 8, 1980, which is now U.S. Pat. No. 4,359,764.

BACKGROUND OF THE INVENTION

I. Field of the Invention

The present invention relates to protective devices for suppressing short duration, high energy impulses, such as lightning strikes, which may occur along coaxial cables or other HF, VHF or UHF transmission lines. More particularly, the invention relates to the use of a discharge tube or device in combination with connectors for being inserted in series with the transmission line.

II. Description of the Prior Art

The use of vacuum tubes in prior radio frequency transmitting and receiving equipment made them somewhat tolerant to nearby lightning strikes since the breakdown voltage of the tubes was relatively high and since the tubes would typically not be damaged unless there was a direct lightning strike on the antenna or the feedline. On the other hand, recent advances in solid state design technology have allowed transistors to replace tubes in most applications. The problem of surge protection or lightning strikes for transistorized receivers or transmitters is especially troublesome in view of the low breakdown voltages for typical solid state devices. Once this low breakdown voltage has been exceeded, the solid state device is no longer operative and must be replaced.

Solid state devices of this type are presently being widely utilized in television receivers, television receiving convertors, cable television distribution and amplification system and other similar VHF and UHF radio frequency systems. The proliferation of solid state devices in systems such as these substantially increases the probability of a large number of complex and expensive electronic devices being destroyed by one well-placed lightning strike.

The cost of the lightning or surge protection has become more economical in view of the large cost of repairing this equipment. This cost factor becomes even more economical when the lightning or surge protection device can withstand multiple lightning strikes of reasonable intensity without the necessity of replacing the protective device or without distruction of any equipment attached thereto. However, these economies of lightning protection are not acceptable if the performance of the system in which the lightning protection device is used is degraded by the insertion of the protection device. Transmitting systems are of the greatest interest in this regard since the insertion loss and VSWR along the transmission line are somewhat critical at VHF and UHF frequencies.

The prior art has many examples of electromagnetic impulse protection devices for radio frequency transmission lines. The earliest devices employed a grounding strap which merely grounded both sections of the transmission line in order to reduce the likelihood of static electricity buildup and the concomitant likelihood of a lightning strike. This solution is obviously unacceptable when continuous transmission of radio frequency energy is required.

Later impulse protection systems employed air gaps in order to allow the lightning or impulse signal to arc across the gap and thereby travel to ground. One example of a device of this type employing air gaps is described in Cushman in U.S. Pat. No. 2,922,913. This device is presently being marketed under the trademark BLITZ-BUG. Devices of this type suffer from several different problems. First, since the device exists in the ambient atmosphere, any arc drawn from one of the spark gaps will cause severe vaporization or oxidation of the gap electrodes. This degredation of the electrodes could substantially increase the subsequent gap firing voltages above the level tolerated by solid state devices. In the extreme, the oxidation or vaporization of the electrodes can render the device useless after one or two lightning strikes. Since there is no external indication of the occurrence of such a lightning strike or the uselessness of the spark gaps internal to the device, the system is left completely unprotected while the device outwardly appears to be operative. Frequent disassembly and inspection of the gaps may be required. Secondly, the large air gaps utilized in devices of this type are not suitable for transistorized equipment. Breakdown voltages of 1500 to 2000 volts are typically required in order to cause an arc to occur between the electrode elements across the air gap. Transistors often will be destroyed by voltages well below this level.

Nelson, in U.S. Pat. No. 3,274,447, discloses a coaxial connector of the type employing an internal gap for allowing the impulse to arc to ground potential. Devices of this type, while more suitable for insertion into coaxial transmission lines, suffer from the same basic oxidation and vaporization problems as described with regard to U.S. Pat. No. 2,922,913.

Other inventors have concentrated on combining protection for radio frequency transmission lines with protection for AC electrical supply protection. Simokat, in U.S. Pat. No. 4,050,092, assigned to the TII Corporation of Lindenhurst, N.Y., is an example of a gas-filled tube being utilized to shunt the electrical energy from a primary electrical conductor to ground in order to protect the sensitive electronic solid state devices coupled to the transmission line. This particular device also protects the AC power lines feeding the receiver or transmitter from an electrical surge. Devices of this type are not suitable for use at high frequencies because, contrary to the teachings of Simokat, no precautions have been taken to assure proper impedance matching and to minimize the insertion loss of the device in the VHF or the UHF transmission lines. Also, the device as described by Simokat is primarily related to receiving applications and would not be suitable for applications involving transmission of radio frequency power. Furthermore, the inherent design of the device as disclosed by Simokat is not suitable for impedance matching for proper operation at UHF frequencies (as used herein UHF frequencies will refer to the frequencies above 400 MHz and below 3,000 MHz).

The Simokat gas-filled tube impulse protection device is widely used on low frequency transmission lines such as power lines, telephone lines, low speed data lines, etc. However, the use of these gas-filled tubes has not been generally successful on radio frequency transmission lines without a substantial degredation of the characteristic impedance of the signal transmission line. This impedance anomaly causes the occurrence of standing waves (VSWR), signal losses, and group phase delays which are highly undesirable and detrimental to the proper functioning of most communications systems.

Martyloff, in U.S. Pat. No. 3,863,111, assigned to the General Electric Company, attacks the surge protection problem by providing a coaxial-type connector which employs a polycrystalline varistor for surge protection. A spring is provided to compress the varistor into electrical contact with ground potential. The spring is designed to form a resonant circuit in conjunction with the conductors within the connector. This spring acts as an inductor which is a low impedance to the relative low frequencies of the impulse, but is a relatively high impedance at higher frequencies. Designs of this type typically are suitable only for use in the HF or VHF region (below 50–100 MHz). The device is typically not useable at frequencies below the self resonant frequency of the coil, and the multiple higher resonant frequencies of the coil and various internal capacitances indicate that, at least at the higher frequencies, the insertion loss will substantially increase and the attentuation curve (as a function of frequency) will be extremely uneven. The reactance of the coil and its related circuit will cause a relatively high VSWR to occur on the line at every series resonant point. These points occur due to stray capacitances. The insertion losses of devices of this type can be substantial at UHF frequencies. Furthermore, the power handling capability of varistors of this type are highly suspect. Devices of this type are usually used only for receiving applications and are not suitable for high power transmitter applications.

Winters, in U.S. Pat. No. 3,777,219, discloses a coaxial connector device which defines an internal cavity. A plurality of semiconductor wafers employing silicon junction avalance-type diodes are carried within the cavity. The occurrence of a large voltage impulse along the center conductor of the device will be shorted to ground (the outside braid of the coaxial connector cable) when the impulse voltage exceeds the threshold voltage of the silicon junction avalanche diodes. Avalanche diodes of this type are not well suited for high power transmission applications because no effort has been made to make the apparent impedance of the unit completely transparent to all RF energies by including it as an integral section of transmission line. Furthermore, the power handling capabilities of the avalanche diodes are somewhat limited, with an 8 microsecond rise and a 20 microsecond delay time being typical. Devices of this type are usually limited to receive only applications and therefore impedance matching at the higher frequencies is not as critical.

The capacitive effects of the diodes limit the design of this protection device to high frequency applications. In order to use it for the transmission of RF energy, the number of diodes must be increased in the series configuration in order to increase the series avalanche voltage. This reduces the current handling capabilities of the device since each diode has a substantial series resistance value. As more diodes are added in series, the total "on" resistance value increases. If the breakdown voltage of each individual diode is increased to handle more power, the size of the diode must also increase as the junction area increases. This also causes an increase in the "off" capacitance for each diode, which will limit the high frequency usage of the device. The diode has a very fast turn-on time, about 10 better than a gas tube, but it has smaller current handling capabilities and power dissipation factors.

McNatt, in U.S. Pat. No. 2,886,744, discloses a coaxial connector device which employs a series connected fuse in the primary circuit conductor. A choke or discreet inductor is coupled from the primary or center circuit conductor to the outside shield conductor. The inventor indicates that this choke will typically limit the use of this device to frequencies in the 25–30 MHz range, which is at the very lowest edge of the VHF frequency bands. A device of this type would not be suitable for use at higher frequencies (such as above 50–100 megacycles) and would not be suitable for use with high powered transmitters.

Various other lightning or surge protection devices are described by Fuller in U.S. Pat. No. 2,896,128, Braumm in U.S. Pat. No. 3,450,923, Jackson in U.S. Pat. No. 1,194,195, Pacent in U.S. Pat. No. 1,527,525, Finkel in U.S. Pat. No. 2,654,857, Grassnick in U.S. Pat. No. 2,237,426, Epstein in U.S. Pat. No. 2,277,216, Boylan in U.S. Pat. No. 2,957,110, Klostermann in U.S. Pat. No. 2,666,908, and Craddock in U.S. Pat. No. 1,892,567. Various other lightning protection and surge protection devices are disclosed by Clark in U.S. Pat. No. 3,934,175 and Brown in U.S. Pat. No. 3,840,781.

Gilberts, in U.S. Pat. No. 4,158,869, discloses the use of a gas discharge tube in a device for protecting telephone lines from electrical impulses or lightning strikes. Lundsgaard, in U.S. Pat. No. 4,142,220, also discloses the use of a gas discharge tube for protecting telephone lines. The present inventor has examined both of these references and does not believe that either of the references is suitable for use at UHF frequencies where impedance matching and insertion losses are of critical importance. Neither of these devices teaches the use of an impedance matching technique whereby the lumped inductances and capacitances, when taken together, represent the same characteristic impedance of the connector and surge protector as compared to the coaxial feed lines.

In contrast to the prior art, the present invention relates to a connector of the type which may be inserted into a length of coaxial radio frequency cable, or other HF, VHF or UHF transmission line, for controlling and dissipating the surge energy (such as lightning) traveling from the antenna side toward the receiver/transmitter side, while not presenting a high VSWR or insertion loss when viewed from the transmitter end toward the antenna end of the line. The capacitance of the discharge device used in the circuit, and other stray or distributed capacitances, are caused to interact with distributed inductive reactance so that the characteristic impedance of the connector, when viewed as a lumped element circuit, will correspond to the characteristic impedance of the transmission line. Thus, the connector will be transparent to the transmitted RF signal, but will be effective in dissipating or shunting the electrical impulse traveling down the line.

SUMMARY OF THE INVENTION

This invention relates to an electrical surge suppressor for dissipating power surges along a radio frequency transmission line of the type having a primary and a secondary conductor and a known characteristic impedance. The suppressor includes a paired first and second electrical connectors, each having primary and secondary conductors for being operatively interposed along the primary and secondary conductors of the transmission line. A discharge device is provided having a known breakdown voltage and a known capacitance between first and a second sections thereof. A first conductor is provided for electrically coupling the first section of the gas discharge tube between the primary conductors of the first and second electrical connectors. A second conductor is provided for electrically coupling the second section of the gas discharge tube to the secondary conductors of the first and second electrical connectors. A capacitor is inserted in series with the first conductor for blocking the flow of D.C. energy therethrough. The first and second conductors have known inductances which interact with the capacitance of the discharge device and the capacitor and stray capacitances of the combination thereof in order to produce a desired characteristic impedance (typically that of the radio frequency cable), whereby the suppressor will dissipate electrical surges while representing a low standing wave ratio for radio frequency energy transmitted along the cable. A groundplane is also disclosed in an alternate embodiment for reducing the length of the conductors and the physical size of the discharge device in an unshielded balanced embodiment.

BRIEF DESCRIPTION OF THE DRAWINGS

Other objects, features and advantages of the present invention will be apparent from a study of the written description and the drawings in which.

Figure 1:
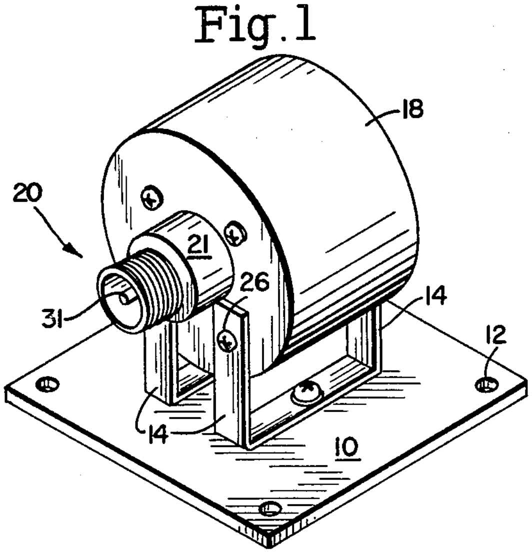
FIG. 1 illustrates a frontal perspective view of a first preferred embodiment of the connector for electromagnetic impulse suppression.

In the drawings, like reference numerals will refer to like parts throughout the several views of each of the embodiments of the present invention. However, variations and modifications may be effected without departing from the spirit and scope of the concept of the disclosure as defined by the appended claims. It should be observed that the elements and embodiments of the present invention have been illustrated in somewhat simplified form in each of the drawings and in the following specification in order to eliminate unnecessary and complicating details which would be apparent to one skilled in this art. Therefore, other specific forms and constructions of the invention will be equivalent to the embodiment described although departing somewhat from the exact appearance of the drawings.

TECHNICAL THEORY DISCUSSION

By utilizing some common fundamentals of electronic low pass filter-matching, a standard T or "$\pi$" network configuration can be calculated so as to utilize the capacitance of a gas tube or other discharge device as a partial or entire capacitor leg of the filter circuit. The unit would be impedance transparent for only a narrow group of RF frequencies and thus the efficiency of the tube or discharge device as a protector would be degraded.

Since a transmission line consists of series distributed inductors (herein known as L's) whose reactance value at any frequency exactly equals the reactance value of a plurality of shunt distributed capacitors (herein known as C's), the transmission line can be synthesized over a wide frequency range as consisting of lumped L's and C's.

If a "T" or "$\pi$" circuit is mirror-imaged below ground, and if the ground is then eliminated (such as in a balanced circuit), the circuit will be identical to the circuit of a synthesized lumped transmission line. By again utilizing the capacitance of a gas tube or discharge device as a partial or whole capacitor leg in the lumped transmission line, the discharge device will become an integral part of the adjacent section of the transmission line. Since transmission lines in general can be used from very low frequencies to microwave frequencies, the efficiency of the tube as a surge protection device is not degraded. Thus, it should now be apparent that the synthesized lumped element transmission line is a special application of the general T or $\pi$ network circuit designs.

Since only one C value is of interest (that of the tube or the tube paralleled with another C), the synthesized lumped transmission line will therefore be segmented as a mirrored T configuration as opposed to the mirrored "$\pi$" configuration. This will eliminate the need for an additional C and will allow the gas tube or discharge device capacitance to be buffered on each side by only L's.

This section of a synthesized lumped transmission line can be made to present any characteristic impedance, as well as being either balanced or unbalanced, and may be constructed with either air or solid dielectric materials.

To calculate the required C value for any transmission line, the following formula can be used:

$$C = \frac{1.016\sqrt{K} \times 10^{-3}}{12\, Z_o} = \mu\text{F/inch}$$

Where $Z_o$ is the desired characteristic impedance (typically the same as the transmission line) and K is the dielectric constant.

To calculate the required L value for any transmission line, the following formula can be used for the same values of $Z_o$ and K:

$$L = \frac{1.016\, Z_o \sqrt{K} \times 10^{-3}}{12} = \mu\text{H/inch}$$

Figure 7:
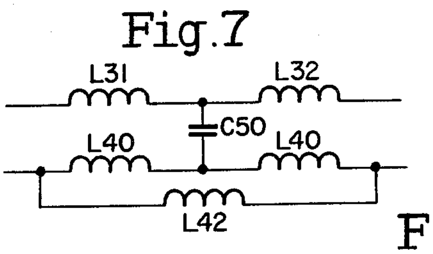
FIG. 7 illustrates the schematic lumped circuit constant elements and diagram for the theoretical reconstruction of the unshielded and unbalanced coaxial line version of the present invention illustrated generally in FIG. 1.

In the unbalanced unshielded type configuration shown in FIG. 7, the gas discharge tube may be mounted between two connectors for convenience. The center connector pins comprise L31 and L32, and the gas tube comprises C50 and is soldered to mounting screw L40. The main mounting screw L40 is of smaller diameter and longer in length than the center connector pins L31-32 and thus will have more inductance than required. Therefore, an additional screw of inductance L42 is added in parallel to reduce the total inductance value. This total value equals the calculated L value, as do L31 and L32 when added together. The formula for calculating these straight length inductances can be found in most engineering textbooks.

This ideal connector configuration typically shows no performance degredation because of its extreme short length when used in conjunction with the typical unbalanced coaxial transmission line, but only as long as conductive material (which upsets the inductive to capacitive ratio balance) is not brought within close proximity of the connector. In order to prevent this reactance imbalance, the unit should be housed in a plastic shell and a standoff mount should be used (which should also be used in the calculations of L). This standoff also provides a connection to ground so that the gas discharge tube can conduct the impulse to ground.

Figure 7A:
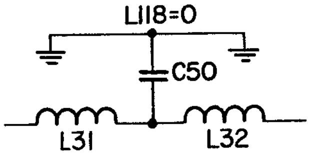
FIG. 7A illustrates the schematic lumped circuit constant elements and diagrams for the theoretical reconstruction of the shielded and unbalanced coaxial line version of the present invention illustrated in FIGS. 5 and 6.

In an unbalanced, metal enclosed, coaxial line configuration illustrated in FIG. 7A, the physical size of the tube causes the presence of additional stray C. This requires that the smallest dimension gas discharge tube should be used with low L standoffs. With a slight increase in the normal concentric size of the outer conductive shell, the inner to outer conductor size relationship is changed from the particular line characteristic impedance. This will cause an increase in L due to a decrease in distributed C. This is again restored to the desired impedance by inserting the gas discharge tube as a lumped capacitance value.

The following formula is useful for calculating the required C value for this coaxial line with relationship to the inside to outside diameters:

$$C = \frac{7.362\, K \times 10^{-6}}{12 \log_{10} D/d} = \mu\text{F/inch}$$

where D is the outside diameter, d is the inside diameter and K is the dielectric constant.

The following formula is useful for calculating the required L value for this coaxial line, as above:

$$L = 11.684 \log_{10} D/d \times 10^{-3} = \mu\text{H/inch}$$

$$L = (140.208/12) \log_{10} D/d \times 10^{-3} = \mu\text{H/inch}$$

for the desired characteristic line impedance $Z_o = \sqrt{L/C}$

Figure 8:
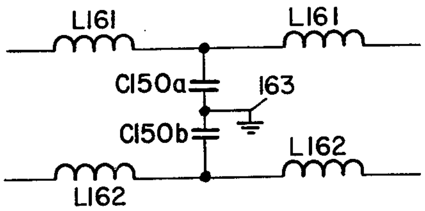
FIG. 8 illustrates the lumped circuit elements and schematic diagrams for the technical reconstruction of a balanced line unshielded and shielded version of the present invention.

Balanced transmission lines, either shielded or unshielded, can be treated in the same manner as previously mentioned for unbalanced lines. FIG. 8 illustrates a schematic diagram of a balanced, unshielded transmission line. Since the RF currents through capacitors **C150*b* are equal and 180 degrees out of phase, there exists a virtual ground where they join, and this virtual ground may be grounded. If a three element gas tube is substituted for the capacitor C150, and the distance and/or dielectric material is changed such that the inductive and capacitive values balance to produce the Z impedance, then the center element of the gas tube can be grounded for impulse protection. The three element gas tube can therefore be thought of as two capacitors C150*a* and C150*b*** in series. The following formulae may be useful for calculating values for the unshielded balanced line:

$$C = \frac{3.681\, K \times 10^{-6}}{12 \log_{10} 2D/d} = \mu\text{F/inch}$$

and $$L = \frac{0.28042 \log_{10} 2D/d}{12} = \mu\text{H/inch}$$

where the relationship $Z_o = \sqrt{L/C}$ is maintained for the desired characteristic line impedance, and where K is the dielectric constant, D is the center to center distance between conductors and d is the diameter of the conductors (both must be in the same units for these formulae).

A stand and a plastic enclosure are required for the same reasons as mentioned for the unbalanced unshielded version. For convenience, two simple 2-lug terminal strips may be used back to back and the three element gas tube soldered in place between them.

The shielded balanced transmission line may be conceptualized as a combination of the balanced line and the coaxial line. Because of the distributed capacitance to ground for both lines, the formulae are slightly more complex. Here, R will be substituted for 2D/d in the above formulae for simplicity.

$$C = \frac{3.681\, K}{12 \log_{10} R} \times 10^{-6} = \mu\text{F/inch}$$

and $$L = \frac{.28042 \log_{10} R}{12} = \mu\text{H/inch}$$

where $R=(2h/d)(1-(h/D)^2)/(1-(h/D)^2)$ and K is the dielectric constant and h is the height above ground and where D and d are as above.

In these formulae $D>>d$ and $h>>d$, while maintaining the ratio of L to C in the formula $Z_o=\sqrt{L/C}$ for the desired line impedance.

For ease of construction, the balanced unit may be redesigned and used inside a conductive shell similar to the unbalanced coaxial shell. In any of the units, depending on the C value of the tube and the desired $Z_o$, the L values may be of a large value and thus warrant the use of discrete values of inductance (such as a coil or coiling of one or more conductors) in order to have ease of construction. Any discrete coil used should be analyzed carefully for the reactance values and for the rise time of the undesirable impulse.

Since a gas tube is somewhat power limited due to its limited heat dissipation factor, there is a need for fail-safe considerations. The unshielded types, both balanced and unbalanced, should be constructed such that the gas discharge tube is soldered in place generally in a somewhat horizontal position. This allows the tube, when heated by shunting impulse energy, to heat to the melting point of the solder before it disconnects itself and falls harmlessly away from its operative condition against the conductors.

The enclosed coaxial line configurations can handle more power since the outside shell can act as a heat sink. However, as with the open line configuration, the tube should also be oriented so as to disconnect itself at the melting point of the solder so that it will fall away.

In order to indicate that the tube has fallen in the fail-safe mode, the unbalanced shielded and unshielded type shells should be made translucent so that a visual or an optical sensor indication would reveal the situation. The enclosed coaxial types should have a small hole or an optical sensor which would not degrade performance. Both systems could utilize a system of monitoring of any change in VSWR as an additional failure indication.

In both instances, when the gas discharge tube disconnects, the surge protection will be discontinued. However, by cascading additional equal threshold surge protection units in the transmission line, protection can be continued since the tube closest to the impulse will typically become the first conductive path. As the temperature of the tube rises from impulse conduction, its conduction threshold will lower and thus insure that a path to ground will be available for the next impulse.

It must be noted that as a tube fails and decouples from the connectors, the additional protection from subsequent impulses can be provided by the cascade technique. However, once the gas discharge tube drops out of the circuit, the circuit is no longer transparent to RF signals and the VSWR and insertion losses will both increase substantially.

The RF power handling capabilities of the unit can be calculated since the voltage threshold versus response time of the gas tube is known and the transmission line impedance is also known. These calculations however, are only valid under matched conditions (VSWR=1 to 1). If this condition is not satisfied, the placement of the unit with regard to the standing wave will determine the RF handling capabilities.

The following embodiments of the present invention are practical applications of the preceeding theoretical considerations. However, it should be noted that while a gas discharge tube is used for purposes of illustration, other gaseous or solid state discharge devices can be substituted provided that proper construction adjustments are made as specified in the prior formulae.

DETAILED DESCRIPTION OF THE PREFERRED EMBODIMENT

A first preferred embodiment of the connector for electromagnetic impulse suppression is illustrated generally in FIG. 1. While FIG. 1 illustrates the unbalanced or coaxial line version of the present invention, other embodiments for use with open line transmission systems will also be within the scope of the appended claims.

The connector for electromagnetic impulse suppression includes a base 10 manufactured of a metallic and conductive material for being coupled through apertures 12 to a grounded or other conductive surface. The base 10 includes a plurality of generally upstanding vertical supports 14 which are mechanically and electrically coupled to the base 10. The distended ends of these vertical supports 14 are coupled to the lower sections of a pair of electrical connectors illustrated generally as 20. The length of the vertical supports 14 are determined so as to provide a separation of approximately 1.00 inch between the center of the paired electrical connectors 20 and the base 10. This separation is important in order to minimize any stray capacitance between the various elements comprising the paired connectors and the other elements spaced therebetween. These vertical supports 14 also provide some distributed inductive reactance as previously discussed.

Figure 2:
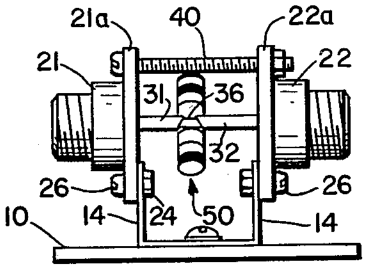
FIG. 2 illustrates a side elevation of the first preferred embodiment illustrated in FIG. 1 without the cover being attached thereto.
Figure 3:
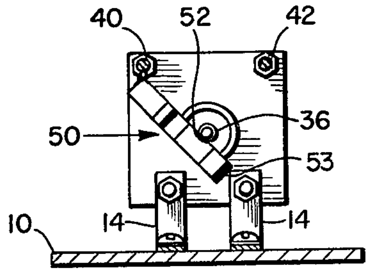
FIG. 3 illustrates an end partially sectioned view showing one connector and the gas discharge tube in the orientation envisioned by the first preferred embodiment without the cover being attached thereto.
Figure 4:
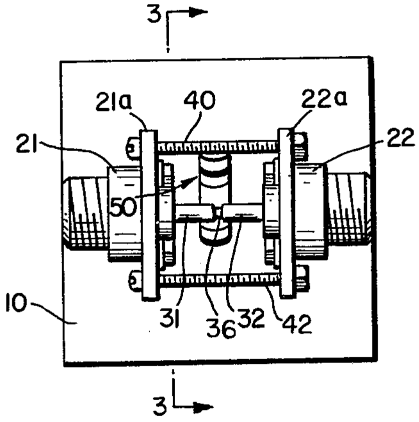
FIG. 4 is a top elevation view of the first preferred embodiment of the present invention without the cover being attached thereto.

As will be seen more clearly in FIGS. 2, 3 and 4, the paired electrical connectors 20 include a first electrical connector 21 and a second electrical connector 22 which, at least for 50 ohm coax, are typically Type-N coaxial connectors manufactured by Amphenol under Part No. 82-24. Connectors of this type have been chosen for low insertion loss at frequencies up to and exceeding 1,000 MHz. The generally upstanding vertical supports 14 are coupled to the lower group of two apertures 24 in the paired electrical connectors 20 by a plurality of bolt, nut and washer combinations 26.

The center conductors 31 and 32 respectively of the first electrical connector 21 and the second electrical connector 22, are disposed adjacent to each other and are electrically coupled through the use of a small center conductor shown generally as 36. The size of this center connecting conductor 36 will generally be determined by the inside diameter of the cylindrical bores located within the center conductors 31 and 32 of the connectors 21 and 22. This center connecting conductor 36 will typically be soldered to both the center conductors 31 and 32 in order to secure the separation therebetween. This separation is typically (for 50 ohms) on the order of 0.72 inches when measured from the inside surface 21*a* of the first electrical connector 21 to the inside surface 22*a* of the second electrical connector 22.

This distance is somewhat critical in that the length of the additional inductive separators communicating between the base surfaces 21*a* and 22*a* will be determined by the distance between the center conductors 31 and 32. Since the length of these additional inductive separators is critical to the overall lumped circuit element impedance of the connector and surge protector, these dimensions should be maintained or coordinated with the lumped circuit capacitance elements in accordance with the above-explained formulae.

While the center conductors 31 and 32, together with the center connecting conductor 36 form the first or primary inductor (see L31 and L32 in FIG. 7), a second circuit inductor (L40 in FIG. 7) is provided for coupling the second electrical conductors or shields of the paired electrical conductors 20. This second inductor has the form of a standard 1 ⅛" 4-40 machine head screw, shown generally as 40, which communicates through the apertures in the flange mounting plates 21*a* and 22*a* of the respective connectors 21 and 22.

The diameter and length of this screw 40 are somewhat critical since at UHF frequencies at or near 1,000 MHz, the diameter and the length of the screw would substantially determine the inductance of the element. Since the cross-sectional diameter of the screw 40 is slightly smaller than the cross-sectional diameter of the center conductors 31 and 32, the inductance of the second inductor 40 is slightly larger than the inductance of the center conductors 31 and 32. Therefore, a second screw or supplemental second inductor 42 is secured through the apertures in the mounting flanges 21*a* and 22*a* of the connectors 21 and 22 for providing additional rigidity in the separation of these two connectors. Since the second screw 42 or supplemental inductor L42 is in parallel with the first screw 40, the total inductance of the two screws will be approximately one half of the inductance of a single one of the screws. This combination results in the inductive reactance of L40 equaling that of L31 and L32. It is this balancing, together with the chosen C value, that will substantially increase the frequency range at which the overall lump circuit elements will match the impedance of the transmission line coupled to the connectors 21 and 22.

As is more clearly illustrated in FIG. 3, a first end of a gas discharge tube 50 (or surge arrestor tube) is electrically and mechanically coupled to the center conductors 31 and 32 of the paired electrical connectors 21 and 22. This electrical and mechanical coupling is typically produced by soldering the middle section of the gas discharge tube 50 to the lower cylindrical surface of the center conductors 31 and 32 at a point generally adjacent to the center connecting conductor 36.

A second section of the gas discharge tube 50 is mechanically and electrically coupled to the first screw (second inductor) 40. Likewise, this coupling is typically accomplished by soldering an upper surface of the gas discharge tube 50 to a lower surface of the screw 40. The fact that the gas discharge tube 50 is coupled by soldering to the underneath surfaces of the center conductors 31 and 32 and the screw 40 is significant in that it is a characteristic of such gas discharge tubes that they will be required to dissipate as heat a part of the impulse energy which is conducted to ground through the device, thereby increasing in ambient temperature. In order to provide a fail-safe mode so that the gas discharge tube 50 will not fail in a continuously conducting mode, and thus short out the transmission line, the heat buildup within the gas discharge tube 50 will typically melt the solder connections thus allowing gravitational forces to disengage the gas discharge tube 50 from its connections with the first screw 40 and the center conductors 31 and 32. This disengagement will cause the gas discharge tube 50 to fall away from the conductors and thus prevent damage to the tube 50 or to the other circuit elements. Of course, when this gas discharge tube 50 decouples from the circuit elements, the main capacitance elements in the lump circuit analogy will have been removed, thus causing an aberration in the insertion loss and the VSWR along the transmission lines. While this increase in VSWR is not helpful for the transmitter attached to the transmission line, it is preferable to have this failure mode rather than to have a failed gas discharge tube continuously conducting and shorting out the transmission line.

Several of these impulse protector connectors may be arranged in a series or a cascade fashion in the transmission line. In this manner if the gas discharge tube 50 in one of the units becomes overheated and disengages from electrical communication between its circuit elements, the remaining units will nevertheless remain operative in order to absorb any electrical surges between the conductors.

In order to observe the normal coupling between the gas discharge tube 50, the first screw 40 and the center conductors 31 and 32, the cover 18 is typically manufactured of a clear or partially transparent plexiglass or plastic material. This will allow visual inspection of the proper coupling of the gas discharge tube 50.

In the first preferred embodiment of the present invention it is envisioned that the gas discharge tube 50 will be of the type produced by TII INDUSTRIES INC. of 100 North Strong Avenue, Lindenhurst, New York 11757, and designated as Model No. 11.

This particular gas discharge tube is a 3-element (of which only two elements are typically connected) design and has a firing or breakdown voltage of approximately 320 volts D.C. As soon as the voltage across the first and second sections of the gas discharge tube 50 exceeds this breakdown voltage, the rare gases within the tube will ionize and form a relatively low resistance path (or shunt) between the two sections of the tube, and therefore between the center conductors 31 and 32 and the first screw 40. Since these elements are coupled to the center conductor and braid elements of the coaxial transmission line, the electrical surge occurring on either of these circuit conductors will be essentially shorted to ground through the vertical supports 14 and the base 10.

This gas discharge tube 50 is substantially more tolerant to large electrical voltage peaks than semiconductor devices, but the terms discharge means or discharge device are intended to include both gas discharge tubes and functionally equivalent semiconductor devices (such as diodes) in applications such as those not concurrently requiring a high breakdown voltage and low capacitance. Gas discharge tubes 50 of this type are capable of handling without distruction several impulses of the type which commonly occur in a single lightning strike. The use of rarified gasses within the discharge tubes substantially reduces the vaporization and oxidization of the elements within the tubes following the ionization of the gas therewithin. Furthermore, since the tubes 50 may be manufactured with precise gaps and with known gases therein, the precise breakdown voltage of the tubes may be carefully and predictably determined. This factor is important for choosing the proper power handling capabilities or breakdown voltages of the gas tubes 50 in accordance with the power handling requirements of the radio frequency transmission line, while placing an accurate limit upon the highest voltage to be allowed along the transmission line as a result of power surges or lightning strikes.

As was previously discussed, since solid state devices in transmitters and receivers coupled to the transmission line are very unforgiving of these large power surges or lightning strikes, the accurate control of the maximum impulse voltage across the lines is most important and the need for predictability is obvious. While the TII model 11 gas discharge tube has been illustrated in the preferred embodiment of the present invention, other models, namely the TII Model 37 and Model 46 gas discharge tubes, may also be used. Taking the TII Model 11 3-electrode gas tube as an example, the maximum D.C. arc voltage under breakdown conditions (glow condition) is approximately 30 volts. The gas discharge tube is advertised as being expected to survive 2,000 surges of 10/1000 waveforms at approximately 1,000 peak amperes each.

For a typical length of 50 ohm coaxial cable such as RG-8U or RG-58U, and for the typical Model 11 gas discharge tube capacitance value of approximately 1.7 picofarads, and for a K value of 1 (corresponding to the device being suspended in air), the value of the lumped circuit conductor inductance L required for the entire connector assembly to represent a 50 ohm impedance would be approximately 4.23 nanohenries per inch. By using the proper spacing between elements 21 and 22, the length of elements 31 and 32 will each yield the 4.23 nanohenries per inch necessary for elements L31 and L32. Using two 1⅛"×4-40 screws 40 and 42 as the inductors L40 and L42, the value of the resulting inductance is approximately 4.23 nanohenries per inch. Therefore, as constructed and illustrated in FIGS. 2, 3 and 4, the electromagnetic impulse suppressor will have a characteristic impedance of approximately 50 ohms for electrical energy from VLF to UHF frequencies.

Experimental data of the preferred embodiment of the present invention indicates that tube insertion losses (exclusive of connector losses) on the order of 0.1 db at 400 MHz and 0.18 db at 1,000 MHz are obtainable in test units. These insertion losses typically will decrease to below 0.01 db at frequencies below 200 MHz. VSWR values on the order of 1.1:1 at 1,000 MHz and 1.01:1 at 200 MHz are obtainable from production units. It will be obvious to one skilled in this art that these figures for insertion loss and VSWR are substantially below other available commercial units. As previously explained, most other commercial units are unable to be operated with reasonable insertion losses and VSWR figures above 300 MHz. In contrast, the present units are well-suited for operation up to and exceeding 1,000 MHz.

Figure 5:
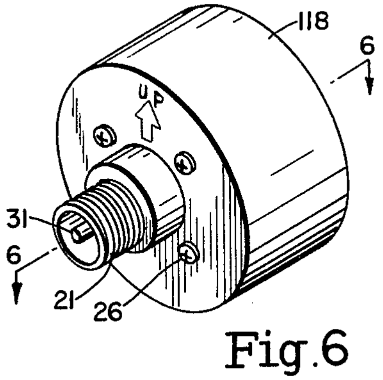
FIG. 5 illustrates a second preferred embodiment of the present invention which utilizes a metallic shield rather than the non-metallic shield utilized in the first preferred embodiment.
Figure 6:
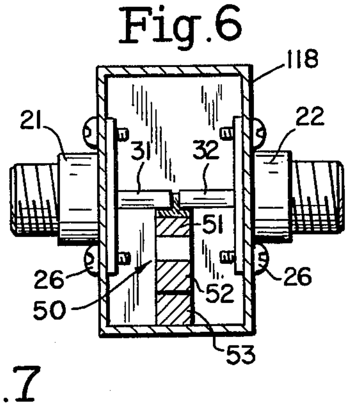
FIG. 6 illustrates a partially cross-sectioned top view of the second preferred embodiment taken along the section lines 6—6 of FIG. 5.

A second preferred embodiment of the present invention corresponding to an unbalanced shielded version is illustrated generally in FIGS. 5 and 6. The second embodiment differs from the first embodiment illustrated in FIGS. 1 through 4 in that no base 10, vertical supports 14 or non-metallic cover 18 are provided. Instead, the second preferred embodiment is provided with a metallic cover 118. The first and second electrical connectors 21 and 22 are coupled to the planar surfaces of the metallic cover 118 in a manner similar to the coupling with the plates 21*a* and 22*a* of the first preferred embodiment. The center conductors 31 and 32 of the electrical connectors 21 and 22 are also electrically and mechanically coupled (0.3 inches in diameter) as in the first preferred embodiment. However, in view of the large surface area and the low inductance of the metallic cover 118, separate screws for additional inductors 40 and 42 are not required as in the first preferred embodiment. Instead, the entire surface of the metallic cover 118 acts as a conductor which unbalances the circuit and shields the other circuit members. For a typical 50 ohm unit, the size of the metallic cover 118 is approximately 1.50 inches in outside diameter, 1 inch in length and 1/32 inches in thickness. These preferred sizes and dimensions produce an inductance which is approximately the same as the inductances 40 and 42 in the first preferred embodiment.

In the second preferred embodiment as illustrated in FIG. 6, the gas discharge tube 50 has a first section 51 thereof coupled directly to the center conductors 31 and 32 and a second section 52 (through a standoff 52) thereof coupled to the inside circumferential surface of the metallic cover 118. As in the case of the first preferred embodiment, the gas discharge tube 50 is soldered to both the center conductors 31 and 32 and to the metallic cover 118. In this manner when the heat dissipated by the conducting gas discharge tube 50 raises the temperature beyond the melting point of the solder used in the connections, the solder will melt and the gas discharge tube will be drawn by gravitational forces away from the center conductors 31 and 32. A mount similar to the first preferred embodiment may be used for proper orientation and grounding of the tube 50. It should be pointed out that a structure of this type may not be required since the coax and its connectors could generally support and orient the tube. The grounding will depend on the system installation and type of coax. However, for ease of installation a stand similar to the supports 124 of the first preferred embodiment would appear to be best suited.

Figure 9:
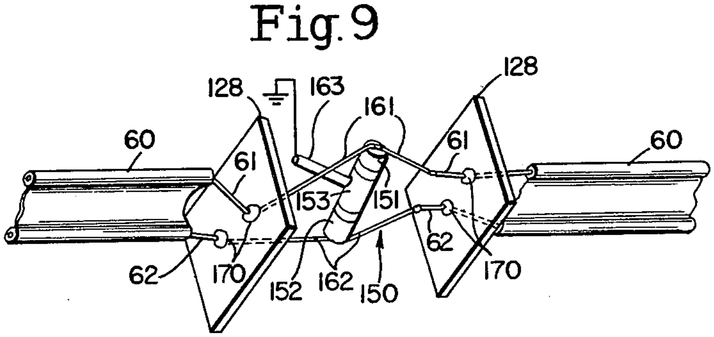
FIG. 9 illustrates a bottom perspective view of an alternate preferred embodiment of the present invention which is specifically designed for use with balanced open line transmission cables.

With reference to FIG. 9, a balanced line version of the present invention is illustrated as being interposed along a length of typical 150 ohm twin-lead transmission line 60. A first conductor 61 and a second conductor 62 of the twin-lead transmission line 60 are routed through insulators 170 contained in two parallel plates 128 which represent the shortened planar surfaces of a non-metallic cover 128 similar to the non-metallic cover 18 of the first preferred embodiment. Each of these circuit conductors 61 and 62 are extended into electrical communication with the corresponding conductor on the adjacent piece of transmission line buy a conductor 161 and 162 respectively. The length and diameter of the conductors 161 and 162 are typically chosen in accordance with the inductance and impedance formulae which have been previously discussed. These inductors, depending on the formulae, may consist of actual coils for some impedances.

A gas discharge tube 150 includes a first end 151 which is coupled to one of the circuit conductors 161 and a second end thereof 152 coupled to the other circuit conductor 162. The center portion of the gas discharge tube 153 is coupled through a relatively large grounding strap 163 to ground potential. This ground potential may be provided through generally low inductance upstanding supports and a base similar to the same elements 14 and 10 in the first preferred embodiment illustrated in FIG. 1.

The electrical schematic diagram of the equivalent lumped circuit elements for the balanced line configuration of the present invention is illustrated generally in FIG. 8. The two upper inductors L161 correspond to the circuit conductor 161 which couples together the first circuit conductors within the twin-lead transmission line 60, while the lower inductors L162 comprise the circuit conductor 162 which couples together the second conductors within the twin-lead transmission line 60. The capacitor C150 comprises the two capacitive elements within the 3-element gas discharge tube 150. The values and interaction between each of these lumped circuit elements has been previously discussed in accordance with the formulae mentioned above.

For a typical 150 ohm impedance balanced line, the values of L161 and L162 would be approximately 12.7 nanohenries per inch. Thus, L161 and L162 could be manufactured of 0.125 inch diameter wire having a length of approximately 1.25 inches. The TII gas tube Model 11 (element 150) is soldered into place as illustrated in FIG. 9. This gas tube 150 has an end-to-end capacitance of approximately 0.7 picofarads. The end planar elements 128 would be spaced apart by approximately 1 inch so as to provide sufficient separation for the inclusion of the gas tube 150.

With continuing reference to FIG. 9, a balanced line shielded version of this alternate embodiment would be similar to the unshielded version with the exception that a metallic shell, similar to the one illustrated as 118 in FIG. 5, would surround the basic balanced configuration. The size of this metallic shell and the new L values would be calculated in accordance with the formulae described previously. The electrical schematic diagram for the balanced shielded embodiment would also be the same as the balanced version shown in FIG. 8.

Typically, the balanced and shielded embodiment would be interchangeable with the balanced unshielded embodiment, and the unbalanced and unshielded embodiment would be interchangeable with the unbalanced shielded embodiment. One major advantage of the shielded embodiment is that any conductive objects which are in close proximity to the connectors 21 and 22 will not cause a significant unbalancing of the impedance through the device primarily due to stray capacitance.

This isolation from nearby conductive objects, as was previously discussed, is the primary reason for utilizing the base 10 and the vertical supports 14 of the preferred embodiment. Also, as was previously discussed, the vertical supports 14 and the base 10 provide a secondary grounding function for providing a more direct circuit conduction of the impulse voltage to ground, rather than depending upon the conduction of the impulse down the grounded or shielded portion of the cable. The lower material costs and the superior grounding features of the first embodiment as illustrated in FIG. 1 make it the preferred embodiment for normal coaxial cable applications.

The preferred embodiments of the present invention may now be distinguished from the prior art references which have already been discussed. First, none of the prior art references utilize a matching network or other impedance sensitive designs which attempt to match the impedance of the mounting devices, or other circuit elements which support or are connected to the gas discharge tube, in order to minimize VSWR and insertion losses. This should be contrasted with the present invention in which the primary structural considerations for mounting the gas discharge tube directly relate to the values of the equivalent lump circuit elements for inductance and capacitance which are required in order to maintain the same effective characteristic impedance for the connector as for the transmission line with which it is used.

Secondly, none of the prior art references discuss applications for impulse suppressor connectors which extend in frequencies up to and beyond 1,000 MHz. Most of the prior art impulse protection connectors are limited by the inductance and capacitance of their constituent elements to operate at frequency ranges below 300 MHz (with acceptable VSWR and insertion loss figures). Thirdly, the present invention is designed for use with high-powered VLF to UHF transmission systems and are not limited in use with VHF or UHF receiving systems as with prior art designs.

The embodiments of the present electromagnetic impulse suppression connectors have been described as examples of the invention as claimed. However, the present invention should not be limited in its application to the details and constructions illustrated in the accompanying drawings and the specification, since this invention may be practiced or constructed in a variety of other different embodiments. Also, it must be understood that the terminology and descriptions employed herein are used solely for the purpose of describing the general concepts of the invention and the preferred embodiment best exemplifying these concepts, and therefore should not be construed as limitations on the invention or its operability.

In the claims the "discharge means" is described as having a known breakdown voltage and a known capacitance between the operative elements thereof. In the preferred embodiment this "discharge means" is defined as a gas discharge tube. This device has a known capacitance (usually small) and a breakdown voltage that is relatively constant and high enough not to break down under voltages typically encountered on high power transmission lines. As stated in the prior art summary, commonly available solid state "discharge means" devices that have sufficiently high breakdown voltages also have a capacitance value which is normally too high for proper operation near the upper frequency limit (1000 MHz) of the present preferred embodiment. However, the term "discharge means" could include any device, whether gas discharge tube or solid state device, having a known breakdown voltage and a known capacitance (assuming the capacity would be within the acceptable range defined by the specified formulae).

IMPROVEMENTS TO ORIGINAL EMBODIMENTS

During the time since the parent application was filed, two additional problems have been identified and solutions are proposed herein.

The first problem relates to the effect known as "crowbar" which occurs when an electrical impulse, such as lightning or EMP, strikes the transmission line. With reference to FIGS. 6 and 7A, this electrical energy will be transmitted down the transmission line until it reaches the discharge device 50, typically a gas discharge tube for the purpose of the present discussion (although semiconductor devices would have generally the same problem was will be discussed subsequently). As the impulse energy reaches and turns on the gas discharge tube 50, the "on" voltage drop across the tube 50 will be approximately 20 to 30 volts. For a typical lightning surge, approximately 40 microseconds may elapse before conditions allow for the impulse voltage to go below this voltage and turn "off" the gas discharge tube. During this time the voltage across the gas discharge tube 50 will represent nearly an ideal voltage source capable of producing extremely large currents into the impedance represented by the radio receiver or transmitter at the other end of the transmission line. Since the semiconductor devices in the receiver and transmitter can easily be destroyed by this 20–30 volts, it is important that some additional means of protection be provided.

Even if polycrystalline materials such as MOVS, or Zener diodes, or other similar solid state devices are substituted for the gas discharge tube 50, the "crowbar effect" is still apparent, even though these devises do not crowbar but instead limit the voltage by a clamping method. As with the gas discharge tubes, the voltage drop across the MOV is not insignificant. This constant voltage source is capable of producing high currents during this period of time which can likewise destroy other semiconductor devices in the receiver and transmitter at the end of the transmission line.

If a Zener diode is utilized for the discharge device 50, the "on" voltage could be less than the 20–30 volts of the gas tube depending on the value of the Zener chosen. However, even a low Zener voltage will provide a constant voltage of high current capacity which could be capable of destroying lower voltage semiconductor devices and other components in the transmitter and receiver at the other end of the transmission line.

An additional requirement of the impulse suppressor described herein is that it must operate independently of whatever load or type of equipment may be placed along either end of the radio frequency transmission line. For example, if the impulse suppressor is utilized in a radio frequency transmission line which is terminated in a shunt fed cavity which has given amounts of inductance and stray capacitance, then during the lightning impulse the cavity can act as a short circuit in the 0 to 5 MHz frequency range. Since the cavity will act like a short circuit, it is unlikely that the voltage across the impulse suppressor will rise high enough to place the voltage sensitive discharge device it in the conducting mode. Under these circumstances it would be possible for the lightning impulse to destroy the cavity or some other part of the circuitry before the impulse suppressor has its intended effect.

Under these circumstances it may be desirable to incorporate improvements into the first embodiment of the present invention in order to solve these problems. A series capacitor may be inserted in the center conductor of the transmission line in order to block D.C. current flowing therethrough prior to the turnon of the discharge device. However, this solution brings about its own problems which must be considered and solved. For example, if the capacitor and it's leads include appreciable inductance at RF frequencies (especially near the upper 1,000 MHz limit) and the transmission line is expected to carry 100 to 300 watts of transmitter power, then the series capacitor can produce unacceptably large losses and VSWR by dissipating power, melting or even disintegrating.

In the present case, a preferred series capacitor is constructed of an NPO material and is manufactured by Johanson Diaelectric, bearing the Model No. 202H42471ZP4 or 302H42151ZP4 or 302H46471ZP4. This a chip capacitor which has no leads, but instead has material on the side of the ceramic chip which is used for soldering contact. The breakdown voltage of the capacitor must be larger than the impulse voltage appearing across the discharge device prior to conduction. Furthermore, the reactance of the capacitor must be small at the highest frequency of operation so that insertion losses are minimized.

Figure 10:
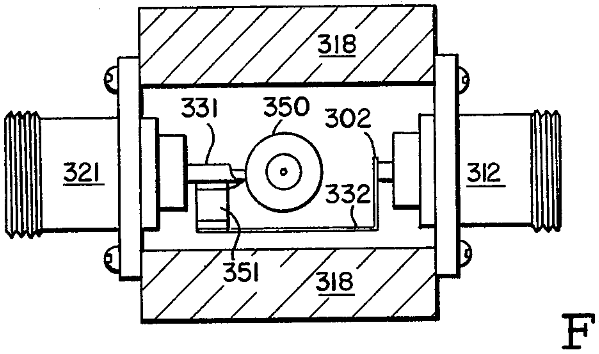
FIG. 10 illustrates a top sectional view of an unbalanced shielded embodiment of the present invention which includes a series D.C. blocking capacitor.
Figure 11:
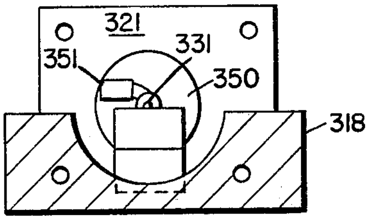
FIG. 11 illustrates a front sectioned view of the unbalanced shielded embodiment of FIG. 10.
Figure 12:
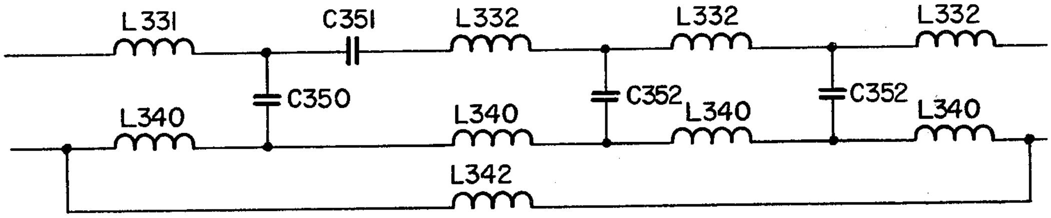
FIG. 12 illustrates a lumped element circuit diagram of the unbalanced shielded embodiment of FIGS. 10 and 11.

With specific reference to the top sectioned view of FIG. 10 and the front sectioned view of FIG. 11, the chip capacitor 351 of NPO material is connected in series with the center conductor 331 of a first connector 321 using the techniques outlined in the previous discussions of the preferred. embodiments. A first side 351*a* of the chip capacitor 351 is soldered to the connector tip 331, which also has the first section 350*a* of a gas tube 350 attached thereto. The opposite end 350*b* of the gas tube 350 is coupled to the conductive support structure 322. The capacitance of the chip capacitor 351 is represented as C351 in the equivalent schematic diagram shown in FIG. 12.

The other side 351*b* of the chip capacitor 351 is soldered to a length of copper braid 332 approximately 1 inch in length and 0.15 inches in width. This braid constitutes inductor L332 in the schemetic diagram illustrated in FIG. 12. This braid 332 is positioned approximately 0.05 inches from the inside cavity wall 318 for a length of approximately 0.65 to 0.7 inches. This separation between the braid 332 and the wall 318 will provide the distributed capacitance C352. The braid 332 is then bent at a right angle and soldered to the center conductor 302 of a second connector 312. It is anticipated that this second connector 312 would be used to connect to the electronic equipment, since the capacitor 351 should be electrically placed between the equipment and the gas tube in order to block the voltage impulse and protect the electronic equipment.

It should be apparent now that the inductive value of the braid 332 (designated as L332) becomes part of the total inductance L32 as illustrated in the schematic diagram of the first embodiment (see FIG. 7). In a similar manner, the distributed capacitance C352 must be balanced with the inductance L332 in order to equal the characteristic impedance of the transmission line. This "matching" procedure can be conducted using the formulae which have been previously discussed with respect to the unbalanced shielded embodiment shown in FIG. 12.

The second improvement relates to the 150 to 300 ohm embodiment which was described in FIGS. 8 and 9 in the parent application. When the 150 ohm version is scaled upwardly to 300 ohms, the separation between the two transmission line conductors (161 and 162 in FIGS. 8 and 9) must be increased. The separation between end plates 128 must also be increased as the impedance increases. Furthermore, the length of the three element gas discharge device 150 must be increased to approximately 4 inches (the separation between the end elements 151 and 152 as illustrated in FIG. 9). Three element gas tubes 150 having these dimensions are not commercially manufactured, and it would be prohibitively expensive to have one specially manufactured for this limited purpose. It would not be advisable to add mechanical or electrical lengthening arms to the ends 151 and 152 of the gas discharge device 150 in view of the extra inductance which would be added. In view of these problems, and with the objective of reducing the size, weight, and complexity of the 300 ohm impulse suppressor while maintaining the same fundamental relationships among the electrical elements as heretofore specified, the following improved version will now be described.

Figure 13:
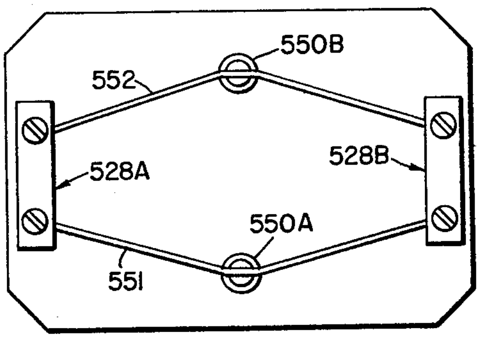
FIG. 13 illustrates a top sectioned view of an unshielded and balanced line embodiment of the present invention.
Figure 14:
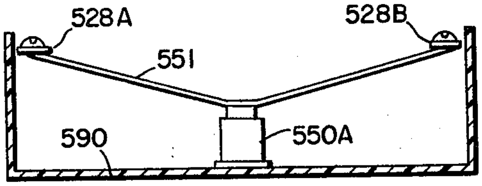
FIG. 14 illustrates an end sectioned view of the unshielded and balanced line embodiment of FIG. 13.

With reference to the top view shown in FIG. 13 and the side view shown in FIG. 14, a metallic conductive groundplane 590 having dimensions of approximately 3.63 inches in length and 2.5 inches in width is provided. Two 2 element gas discharge tubes 550*a* and 550*b* are mounted vertically near the center point of the groundplane 590. Two screw terminals 528*a* and 528*b* are located adjacent to the ends of the groundplane 590 but are spaced vertically therefrom by a approximately 0.8 inches. The screw terminals 528 are provided for connecting with the first and second conductors of the 300 ohm transmission line 60 (not shown in FIGS. 13 and 14). The corresponding screws on terminals 528*a* and 528*b* are coupled with the top section of gas discharge tube 550*a* by a length of 17 gauge wire 561 (0.045 inch diameter). The total length of wire 561 is 3.65 inches, with the gas discharge tube 550*a* being located generally at the midpoint thereof. In a similar manner, a 3.65 inch long piece of 17 gauge wire 562 is used to connect corresponding screws on terminals 528*a* and 528*b* with the top section of gas discharge tube 550*b*. Gas discharge tubes 550*a* and *b* are typical two element gas discharge tubes manufactured by TII under Model No. 37B. The typical breakdown voltage for these tubes is 320 volts and the typical capacitance between operative elements is 1.74 picofarads. This then gives a total series capacitance of one half this value or 0.87 picofarads between conductors 561 and 562.

With specific reference to FIG. 14, it should be noted that the typical heighth of the gas discharge tubes 550*a* and *b* is only approximately 0.5 inches, whereas the screw terminals 528*a* and *b* are displaced approximately 0.8 inches above the groundplane 590. Therefore, there is a height differential of approximately 0.3 inches between the top of the gas tubes 550*a* and *b* and the bottom of the terminals 528*a* and *b*. Under these circumstances the average separation between the transmission line wire 561 and the groundplane 590 (as well as transmission line wire 562 and groundplane 590) is approximately 0.65 inches. If the distance between the gas discharge tubes 550*a* and *b* is chosen to be approximately 1.5 inches, then it can be calculated that the characteristic impedance of the surge suppressor shown in FIGS. 13 and 14 is approximately 300 ohms.

A careful review of the prior discussion with regard to the balanced line embodiment illustrated generally in FIG. 9 will indicate that the use of the groundplane 590 has allowed certain dimensions for this new embodiment to be substantially reduced. The theoretical derivations of the formulae used to determine the effective impedance of the embodiment illustrated in FIGS. 13 and 14 are very similar to the formulae used to describe the characteristic impedance of the shielded version of the impulse suppressor as described previously (with height being substituted in lieu of diameter).

The following formulae will be suitable for determining dimensions and construction parameters for this embodiment:

$$C = \frac{3.681\,K}{12\log_{10}R} \times 10^{-6} = \mu\text{F/inch}$$

where K is the dielectric constant and R is $$R = (2A/d)\sqrt{1 + (A/2h)^2}$$

and where A is the center to center distance in inches between the two wires, d is the diameter of the wires and h is the height above the groundplane (foil), and $$L = \frac{.28042}{12}\log_{10}R = \mu\text{H/inch}$$

where R is as above, and where $Z=\sqrt{L/C}$ is mantained for the desired line impedance.

Of course, the DC blocking capacitor which was previously discussed with reference to the coaxial or unbalanced line embodiment can also be inserted along conductors 561 and 562. It would be preferrable to place the blocking capacitors between the gas discharge tube and the receiver/transmitter termination for the reasons previously discussed. The size of the capacitors and the type of material used for the capacitors are also the same as were discussed with regard to the unbalanced line embodiments.

It should be noted that the groundplate concept as discussed above also could be utilized with regard to three element gas discharge tubes of the type and with the construction described with reference to FIG. 9.

The proximity of the groundplane to the transmission line conductors reduces the size so as to be in the range which is more compatible with that of the 150 ohm transmission line. While it cannot be accurately stated that the groundplane is used to "match" the characteristic impedance of the transmission line, it can be correctly stated that the groundplane becomes an integral part of the electrical makeup of the transmission line and thus allows the physical size to become reduced for a given impedance.

The preferred embodiments of the present invention have been generally described as using a gas discharge tube for the discharge device. It has been explained that semiconductor devices could be substituted for the gas discharge tube under proper design situations, but at the present time the inventor is not aware of any semiconductor device which would have the required breakdown voltage, low resistance and low capacitance characteristics similar to those of the gas discharge tube required by the present invention for operation at high power levels and at frequencies approaching 1,000 MHz. At the present time the state of the art in semiconductor devices can achieve a low to medium breakdown voltage (on the order of 1.33 v to 250 volts), a relatively high capacitance (a minimum of approximately 130 picofarads) and a relatively low power dissipation (on the order of 15 KW/MS peak). However, these all of these characteristics do not occur simultaneousely in the same device.

At the present state of the art, the current conducting capacity (internal resistance during conduction) and capacitance values represent a tradeoff. If the surface area of the semiconductor junction is made sufficiently large to handle the large surge currents, then the capacitance value for the semiconductor device becomes extremely large. Typically these semiconductor devices also have a breakdown voltage (equal to their "on" voltage) which would have to be higher than the rf signal voltage occuring along the transmission line. This is not the case for a typical 500 volt gas tube which, because of its "crowbar" characteristic, has an "on" voltage in the 20–38 volt range (arc voltage).

It may be possible under certain design criteria to cascade the semiconductor diodes in order to increase the combined breakdown voltage of the diode string. Placing the diodes in series furthermore reduces the total capacitance of the diode string to a more manageable level. Unfortunately, the series coupling of the diodes substantially increases the effective resistance (during the "on" state) and therefore substantially reduces the current handling capability of the diode string below that necessary for handling lightning or EMP surge currents.

While these apparently mutually exclusive design objectives have not yet been reached in a single semiconductor device, it may be possible to use existing diodes (typically a model No. GHV-8, manufactured by General Semiconductor Industries of Tempe, Ariz.) in situations where low power is being transmitted in the high frequency (HF) spectrum.

For example, it is possible to design a hybrid impulse suppressor device using the previously explained concepts by combining the advantages of the gas discharge tubes and the presently available semiconductor devices. With specific reference to FIG. 15, an unbalanced and shielded version of the present invention is illustrated in schematic lumped circuit element form in the same general manner as FIG. 7A. However, in the present case the single gas discharge tube (previously C50) has been replaced with a semiconductor diode C650 which is placed between the electrical inductances L631 and L632 (corresponding to L31 and L32 in the prior discussions). Also, dual element gas discharge devices (typically Reliable Electric Co. Model SR-90L) have been placed adjacent the connectors so as to be located substantially beyond the lumped inductance values L631 and L632.

One advantage of this new embodiment is that it is essentially bidirectional, meaning that it will respond equally well to an energy surge coming from either direction. The semiconductor diode 650 would allow the device to begin shunting the electrical energy from the center conductor to ground potential at a relatively low voltage. By adjusting L631 and L632 in accordance with the prior teachings, the characteristic impedance of the impulse suppressor can be matched to that of the transmission line. Furthermore, the gas discharge tubes 651 and 652 will provide additional current handling capacity when the surge voltage exceeds their turn on or ionization voltage.

For example, if the gas discharge tubes 651 and 652 were 90 volt tubes capable of handling 5,000 amps and if the semiconductor device 650 had a turn on voltage on the order of 5 to 12 volts, then small inductors in series with the input or output lines to balance the capacitance of the gas discharge tubes 651 and 652 would be unnecessary. The capacitance values for 651 and 652 would be relatively insignificant compared to the large capacitance of semiconductor device 650, which will probably determine the upper frequency range of the suppressor and the operative values of L631 and L632.

The relatively larger value of the inductors L631 and L632 (when compared to the embodiments discussed earlier) will have several advantages. The larger inductance will slow down and limit the surge current into the semiconductor device. This L di/dt voltage drop helps on very fast rise time pulses in order to allow the voltage across the discharge tubes C651 (or C652 as appropriate) to rise high enough and quickly enough to enable the gas tube to assist the diode C650 in current shunting. The additional large inductor L632, located in series with the center conductor, will further serve to limit the surge current as well as filter any high frequency components which are generated by the gas tube "crowbar" action and the clamping action of the semiconductor device. This filtering takes place because when the shunting elements (gas tube and/or semiconductor) are active, there is a momentary disruption of the normal operating impedance of the unit with respect to the transmission line impedance. The gas tube C652 furthest down the transmission line from the source of the electrical surges will probably not go into conduction.

Figure 15:
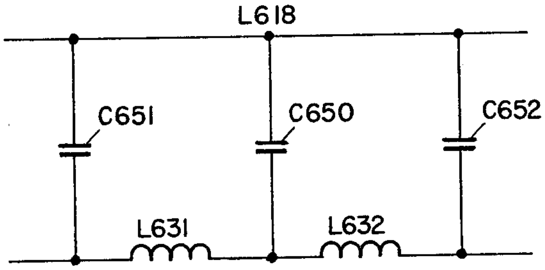
FIG. 15 illustrates the lumped circuit equivalent schematic for a hybrid version of an unbalanced shielded impulse suppressor.

Therefore, the bidirectional nature of the surge protector disclosed in FIG. 15 can be used to protect sensitive electronic equipment located at either end of a long unbalanced transmission line. This type of device would be suitable for use with high frequency transmission equipment, high frequency modems, etc.

Figure 16:
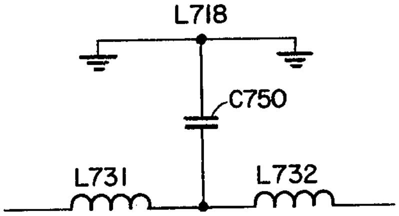
FIG. 16 illustrates a solid state embodiment of an unbalanced shielded impulse suppressor.

By extending the discussion of the forgoing device into a completely solid state embodiment as illustrated in FIG. 16, a semiconductor device 750 (represented by the capacitance C750) is inserted into the unblanced shielded embodiment of the device previously illustrated in FIGS. 5 and 6 and shown in the lumped circuit diagram of FIG. *7a*. The inductors L731 and L732 are calculated in accordance with the previous discussions for the unbalanced shielded embodiments using gas discharge tubes. The capacitance C750 for the semiconductor device will be much larger than the corresponding capacitance for a gas discharge tube. Therefore, the value of the inductors L731 and L732 must be increased accordingly. This can be accomplished by increasing the length of inductor L731 (which corresponds to the center conductor 31 illustrated in FIG. 6) and the length of the inductor L732 (corresponding to the center conductor 32 in FIG. 6). This adjustment can also be accomplished by adjusting the ratio of the outside diameter of the shielding cavity (shown as 118 in FIG. 6 which corresponds to L718 in FIG. 16) with respect to the diameter of the conductors 731 and 732 in FIG. 16 (which correspond to conductors 31 and 32 shown in FIG. 6). These adjustments can be made in conjunction with each other or separately in accordance with the previously discussed formulae for the unbalanced shielded embodiment of the invention. For some semiconductor device C750 having unusually large capacitance values, it may be advisable to include an actual inductor circuit element in order to supplement the inductance provided by L731 and L732. These additional inductors may comprise normal wire coils (with the stray capacitance taken into account) inserted in series with the center conductor (for example elements 31 and 32 illustrated in FIG. 6).

For the preferred embodiment illustrated schematically in FIG. 16, the semiconductor device 750 would correspond to a transorb device (or mosorb device) such as Model No. GHV-7 or GHV-8 manufactured by General Semiconductor Industries of Tempe, Ariz. The typical capacitance of this device is on the order of 130 picofarads, which would typically limit the upper frequency limit to approximately 30 MHz for a 50 ohm impulse suppression device. The breakdown voltage of the device is on the order of 5 volts which would limit the transmission of RF power along the transmission line to no more than 0.5 to 0.25 watts. As was previously discussed, the power limitation of 0.5 watts for a 50 ohm system is substantially below the 1000 watt transmission capability of a similar unit using a gas tube device. At the upper frequency limit of 1000 MHz, a gas tube type device would typically have a power rating of 125 watts. However, in the future when solid state devices are available with lower capacitance, higher breakdown voltages and higher current capabilities, then the solid state embodiment of the present invention designed in accordance with these teachings should be capable of approaching, if not surpassing, the embodiments utilizing gas discharge tubes.

I claim:

1. An electrical impulse suppressor for shunting electromagnetic impulse energy along a radio frequency signal transmission line of the type having primary and secondary conductors and a known characteristic impedance therebetween, the suppressor comprising in combination:

paired first and second electrical connectors each having primary and secondary conductors for being operatively interposed along the primary and secondary conductors of the radio frequency signal transmission line;

first and second discharge means each for defining a known breakdown voltage and a known capacitance between first and second sections thereof;

first means for electrically coupling said first section of said first discharge means between said primary conductors of said first and second electrical connectors;

second means for electrically coupling said first section of said second discharge means between said secondary conductors of said first and second electrical connectors; and groundplane means located adjacent said first means and said second means for electrically coupling said second section of each of said discharge means to a ground potential, with said first means and said second means and groundplane means having known inductances which interact with said capacitances of each of said discharge means and any stray capacitance of the combination thereof to produce a characteristic impedance which is generally equal to the characteristic impedance of the radio frequency signal cable, whereby the suppressor will shunt electrical impulse energy to ground potential while normally representing a low standing wave ratio for radio frequency energy transmitted along the transmission line.

2. The impulse suppressor as described in claim 1 wherein:

said first means comprises first inductor means operatively coupled between said primary conductors of said first and second electrical connectors; and wherein said groundplane means is generally parallel to said first and said second inductor means.

3. The impulse suppressor as described in claim 1, wherein said first and second discharge means comprise non-air gap type devices.

4. The impulse suppressor as described in claim 1, wherein said first and second discharge means comprise discharge tubes filled with a gas.

5. The impulse suppressor as described in claim 1, further including capacitor means interposed in series along said first means and along said second means so as to block the flow of low frequency and D.C. energy therethrough.

6. An electrical impulse suppressor for shunting electromagnetic impulse energy from the center conductor to the shield of a coaxial transmission line having a known characteristic impedance, the electrical surge suppressor comprising in combination:

a first conductor interposed between adjacent sections of the center conductor;

a capacitor coupled in series with said first conductor for blocking the flow of low frequency and D.C. energy therethrough;

a circumferential conductor interposed between adjacent sections of the shield so as to define a cavity therein;

discharge means for defining a known breakdown voltage and a known capacitance between first and second sections thereof, with said first section coupled to said first conductor and with said second section coupled to said circumferential conductor such that said discharge means and said capacitor are at least partially contained within said cavity defined by said circumferential conductor; and wherein the inductance of said first conductor and said circumferential conductor interact with said capacitance of said discharge means and said capacitor and stray capacitance of the combination thereof so as to produce a desired characteristic impedance generally equal to the characteristic impedance of the coaxial transmission line, whereby the impulse suppressor will shunt impulse energy exceeding the breakdown voltage of said discharge means from the center conductor to the shield while normally representing a low VSWR for radio frequency energy transmitted along the coaxial transmission line.

7. The impulse suppressor as described in claim 6 wherein said discharge means comprises a non-air gap type device.

8. The impulse suppressor as described in claim 6 wherein said discharge means comprises a discharge tube having a gas other than air therein.

9. The electrical impulse suppressor as defined in claim 6 wherein said first conductor comprises the center conductor sections of opposing coaxial connectors.

10. A combination matching network and electrical impulse suppressor for matching the characteristic impedance along a coaxial cable and for shunting electromagnetic impulse energy from the center conductor to the shield thereof, the device comprising in combination:

paired first and second electrical connectors each having a primary conductor coupled to the center conductor of the coaxial cable;

a capacitor interposed between said primary conductors of said first and second electrical connectors for blocking the flow of low frequency and D.C. energy therethrough;

a circumferential conductor interposed between adjacent sections of the shield of the coaxial cable so as to define therein a cavity for at least partially containing said primary conductors of said first and second electrical connectors;

discharge means for defining a known breakdown voltage and a known capacitance between first and second sections thereof, with said first section coupled to said capacitor and with said second section being coupled to said circumferential conductor such that said capacitor and said discharge means are contained at least partially within said cavity; and wherein the inductances of said primary conductors and said circumferential conductor interacting with the capacitance of said discharge means and said capacitor and stray capacitances of the combination thereof so as to produce a desired characteristic impedance having a known relationship to the characteristic impedance of the coaxial cable, whereby the device will normally represent a low VSWR for radio frequency energy propagating along the coaxial cable.

11. The device as described in claim 10 wherein said discharge means comprises a non-air gap type device.

12. The device as described in claim 10 wherein said discharge means comprises a gas discharge tube having therein a gas other than air.

13. The device as described in claim 10 wherein said desired characteristic impedance comprises a matching network for matching an impedance along one part of the coaxial cable with a different impedance along another part of the coaxial cable.

14. A method for matching the characteristic impedance of a radio frequency transmission line of the type having first and second conductors while shunting electromagnetic impulse energy traveling therethrough, said method comprising the steps of:

(a) electrically interposing primary and secondary conductors along corresponding first and second conductors of the transmission line;

(b) coupling discharge means, for defining a known breakdown voltage and a known capacitance, between said primary and secondary conductors;

(c) interposing a capacitor in series in at least one of said first and second conductors for blocking the flow of low frequency and D.C. energy therethrough;

(d) matching the characteristic impedance of the transmission line with the characteristic impedance represented by the combination of said primary conductor, said secondary conductor, said capacitor and said discharge means and any stray capacitance associated with the combination thereof, while enabling said discharge means to shunt electromagnetic impulse energy between the first and second conductors of the transmission line.

* * * * *